US 6,571,902 B2

(12) United States Patent
Heyne et al.

(10) Patent No.: US 6,571,902 B2
(45) Date of Patent: Jun. 3, 2003

(54) BACKHOE AUXILIARY HYDRAULICS CONTROL SYSTEM

(75) Inventors: Dennis J. Heyne, Burlington, IA (US); Peter J. Dix, Naperville, IL (US)

(73) Assignee: Case Corporation, Racine, WI (US)

( * ) Notice: Subject to any disclaimer, the term of this patent is extended or adjusted under 35 U.S.C. 154(b) by 81 days.

(21) Appl. No.: 09/750,854

(22) Filed: Dec. 28, 2000

(65) Prior Publication Data

US 2002/0084135 A1 Jul. 4, 2002

(51) Int. Cl.$^7$ ................................................. B62D 1/12
(52) U.S. Cl. ..................... 180/321; 74/479.01; 74/491; 74/523; 180/324; 212/288
(58) Field of Search ................................. 180/321, 315, 180/324, 331, 332; 414/685; 212/287, 288; 74/523, 479.01, 491

(56) References Cited

U.S. PATENT DOCUMENTS

| | | | | |
|---|---|---|---|---|
| 2,345,224 A | * | 3/1944 | Upp | |
| 4,645,030 A | * | 2/1987 | von Bernuth et al. | 180/315 |
| 5,110,253 A | * | 5/1992 | Ernst et al. | 414/694 |
| 5,424,623 A | * | 6/1995 | Allen et al. | 180/324 |

* cited by examiner

*Primary Examiner*—Eric Culbreth

(57) ABSTRACT

A method of automatically setting an auxiliary hydraulic valve's flow rate and returning to that flow rate automatically is disclosed. The work vehicle such as a backhoe has two hand controls, one of which has a button, and the other has a thumb wheel. To set the hydraulic flow rate, one both presses the button one hand control and moves the thumb wheel on the other hand control until the proper flow rate is reached. At this point, both button and thumb wheel are released. This causes the flow rate to be saved in RAM or ROM memory. The flow rate can be varied at any time by rolling the thumb wheel up or down. One can return to the previously save flow rate by pressing the button. Both controls are preferably spring loaded.

10 Claims, 4 Drawing Sheets

BACKHOE AUXILIARY HYDRAULICS CONTROL SYSTEM

FIELD OF THE INVENTION

The invention relates generally to construction vehicles such as backhoes. More particularly, it relates to construction vehicles having auxiliary control valves for controlling the flow of hydraulic fluid to implements attached to the vehicle. Even more particularly, it relates to such vehicles with dual hand controls for controlling the auxiliary valve.

BACKGROUND OF THE INVENTION

Construction and agricultural vehicles such as backhoes, front loaders, dozers and the like are provided with implements that are physically attached to the vehicles and are used in conjunction with other moveable elements of the vehicle.

For example, front loaders may equipped with post-hole diggers mounted on the front of the vehicle in place of the bucket that is normally used.

These implements are commonly dynamic, and include hydraulic motors that are powered by a hydraulic pump on the vehicle itself. Thus, the hydraulic pump can move the various jointed arms and levers of the vehicle using hydraulic power, and can also power the attachable implements using the same power source.

A further advantage to these assemblies is that the vehicle manufacturers typically put a valve control and switch or other manually operable member in the cab to control the flow of hydraulic fluid to the implement. This is understandably necessary, since not every implement requires the same amount of hydraulic fluid flow or pressure to operate.

Typical two-handled construction vehicles, such as those described above were modified to include a pressure regulator valve configured to regulate the flow of hydraulic fluid to the implement and a switch connected to an on-off valve to turn the flow either on or off to the implement.

For many implements, this was satisfactory. The operator could adjust the fluid flow rate by turning the flow control valve's knob, then flip the on-off switch to start the implement moving. For those implements that needed a constant fluid flow rate, this was sufficient.

Unfortunately, other implements needed a variable flow rate as they were moved. In order to move the implements, it was necessary to hold and manipulate the two handles of the vehicle. The movement of the handles forward and backward causes the entire vehicle to go forward or backward. By pressing buttons on the handles, the various linkages in the vehicle's boom or front loader linkage were caused to raise, lower, swing left, swing right, extend and retract.

It was impossible to vary the flow rate to the implement as the vehicle and its boom and loader linkages moved. In order to vary the flow rate, either by turning the auxiliary valve switch on and off, or by rotating the pressure regulator valve required the operator to remove his hands from the handles. Unfortunately, when he removed his hands from the handles, he could no longer either move the vehicle or the boom and loader linkages coupled to it.

More recently, a spring-loaded thumbwheel was provided on one of the hand controls to permit the aux flow rate to be changed without the operator's hands being removed. Unfortunately, this required the operator to constantly maintain thumb pressure on the wheel to keep the desired flow rate. If for any reason the wheel was accidentally released, it would spring back to an "off" position. This arrangement was awkward, at best.

What is needed therefore, is an apparatus for controlling an attachable implement of a construction vehicle while permitting the operator to simultaneously move the vehicle, its boom or its loader. It is an object of this invention to provide such an apparatus.

SUMMARY OF THE INVENTION

In accordance with a first embodiment of the invention a work vehicle is described that is configured to be coupled to an implement operated by a flow of hydraulic fluid. the vehicle includes a chassis, an engine coupled to the chassis, a hydraulic pump rotationally coupled to the engine to generate a flow of pressurized hydraulic fluid, an auxiliary proportional control valve fluidly coupled to the pump to receive regulate and transmit the flow of pressurized hydraulic fluid and configured to be fluidly coupled to the implement and responsive to a valve-opening signal, an implement support arm pivotally coupled to the chassis and configured to be moved in at least two directions, a first hand control manipulable to move the arm in a first direction, the hand control including a first operator actuable switch, a second hand control configured to move the arm in a second direction different from the first direction, the second hand control including a second operator actuable control having a plurality of positions, and a digital controller coupled to both the first operator actuable switch and the second operator actuable control, wherein the controller is configured in a first mode of operation to generate the valve opening signal indicative of the position of the second operator-actuable control when the second control is in each of said plurality of positions, and further wherein the controller is configured in a second mode of operation to record a digital value indicative of the valve opening signal when the second operator actuable control is in each of the plurality of positions and when the operator actuates the first switch.

The first hand control may be disposed to be operated by one hand of the operator and the second hand control may be disposed to be operated by another hand of the operator. The first and second hand controls may be disposed to permit simultaneous operation by the operator. The support arm may be a backhoe assembly including a boom, a dipper and a bucket linkage. A first of the two directions may be the boom's rotation about the pivotal axis.

In accordance with a second embodiment of the invention, a method of setting and retrieving a predetermined auxiliary hydraulic fluid flow rate for an implement actuated by a variable flow of hydraulic fluid that is attached to a hydraulically moveable arm extending from a work vehicle having an operator's station and at least two hand controls, wherein one hand control is configured to drive a first actuator to move the member in a first direction and the second hand control is configured to drive a second actuator to move the member in a second direction different than the first direction, wherein the first hand control includes a first finger control configured to generate a signal when actuated by a finger, and the second hand control includes a second finger control that generates a varying signal based upon the degree of deflection of the second finger control is disclosed, the method including manipulating the first hand control to position the member in a first position, manipulating the second hand control to position the member in a second position different from the first position, engaging the first finger control, engaging the second finger control to generate a signal indicative of a desired auxiliary hydraulic fluid flow rate, substantially simultaneously with the first finger control, and automatically recording a digital value indicative of the desired auxiliary fluid flow rate based upon the simultaneous engagement of the first and second finger controls and a degree of deflection of the second finger control.

The method may include the steps of, releasing the first and second finger controls, re-engaging the first finger control after the step of releasing, and automatically generating the desired auxiliary hydraulic fluid flow rate in response to the step of re-engaging. The method may also include the steps of releasing the first and second finger controls, re-engaging the first finger control, re-engaging the second finger control to generate a second signal indicative of a second desired auxiliary hydraulic fluid flow rate, substantially simultaneously with the first finger control, and automatically recording a second value indicative of the second desired auxiliary fluid flow rate based upon the simultaneous engagement of the first and second finger controls. The method may also include the steps of turning the work vehicle off, turning the work vehicle on, and going to a predetermined auxiliary flow rate different from the desired auxiliary fluid flow rate.

In accordance with a third embodiment of the invention, a method of setting a predetermined auxiliary hydraulic fluid flow rate for an auxiliary hydraulic valve of a backhoe/excavator having two hand controls, and a seat, wherein one hand control is disposed to be grasped and operated by a left hand of the operator, and another hand control is disposed to be grasped and operated by a right hand of the operator, and further wherein the two hand controls are configured to perform the functions of swinging the backhoe boom, raising and lowering the backhoe boom, raising and lowering the dipper, and opening and closing a bucket linkage, and further wherein one of the hand controls has a momentary contact button, and another of the hand controls has a proportional input device disposed for use by the operator's finger is disclosed, the method including the steps of engaging the button, engaging the proportional input device to generate a signal indicative of a desired auxiliary hydraulic fluid flow rate, substantially simultaneously with the button, automatically recording a value indicative of the desired auxiliary fluid flow rate based upon the simultaneous engagement of the button and proportional input device and a degree of deflection of the proportional input device, releasing the button and the proportional input device, re-engaging the button after the step of releasing, and automatically generating the desired auxiliary hydraulic flow rate after the step of re-engaging the button.

DETAILED DESCRIPTION OF THE PREFERRED EMBODIMENTS

Figure 1:
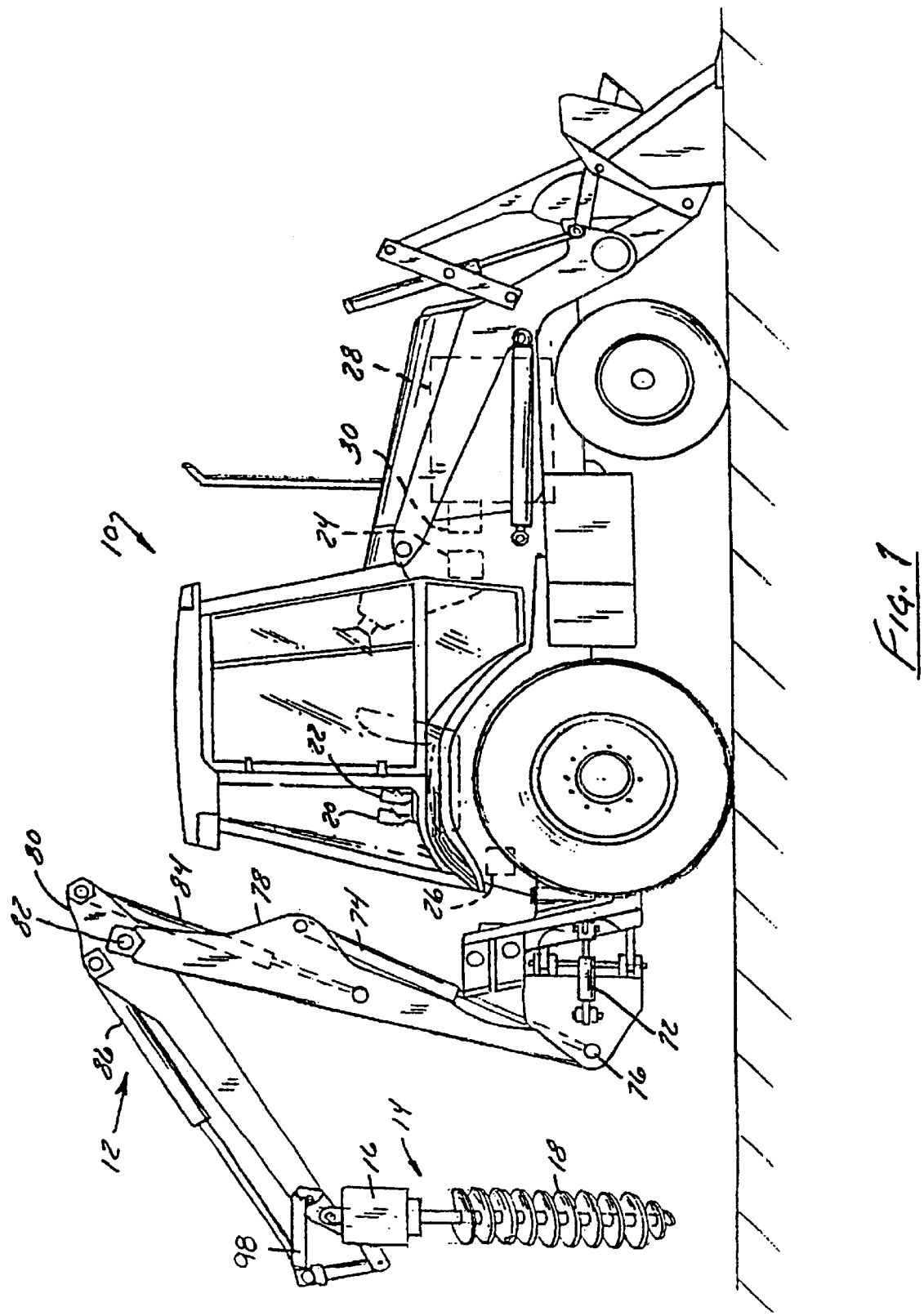
FIG. 1 shows a construction vehicle, a backhoe, having an implement, a rotary well digger, attached to the end of its boom, as well as the digital controller that controls the operation of the boom and the implement attached to the boom.

In FIG. 1, a construction vehicle, here shown as backhoe 10, has a jointed arm 12 with an implement 14 coupled to its free end. The implement, shown here as a posthole digger, includes a rotating hydraulic motor 16 that is coupled to and drives a digger bit 18. The posthole digger is extended away from the vehicle until it is located over the proper location for a posthole. The drive of the digger is engaged, and the rotating bit is brought into contact with the ground. As the digger rotates, a downward force is applied as it digs into the ground, and a posthole is created.

Inside the cab of vehicle 10 are two operator levers 20, 22, which are disposed on each side of the operator's seat (not shown) where one can be grasped by the right and the other can be grasped by the left hand of the operator. Levers 20, 22 each have several operator controls disposed at their upper ends that are coupled to digital controller 24. Digital controller 24, in turn is coupled to and controls the opening and closing of proportional control valve 26. Valve 26, in turn, is fluidly coupled between hydraulic pump 30 and implement 14 to control the flow of fluid to the implement. Engine 28 drives pump 30.

Figure 2:
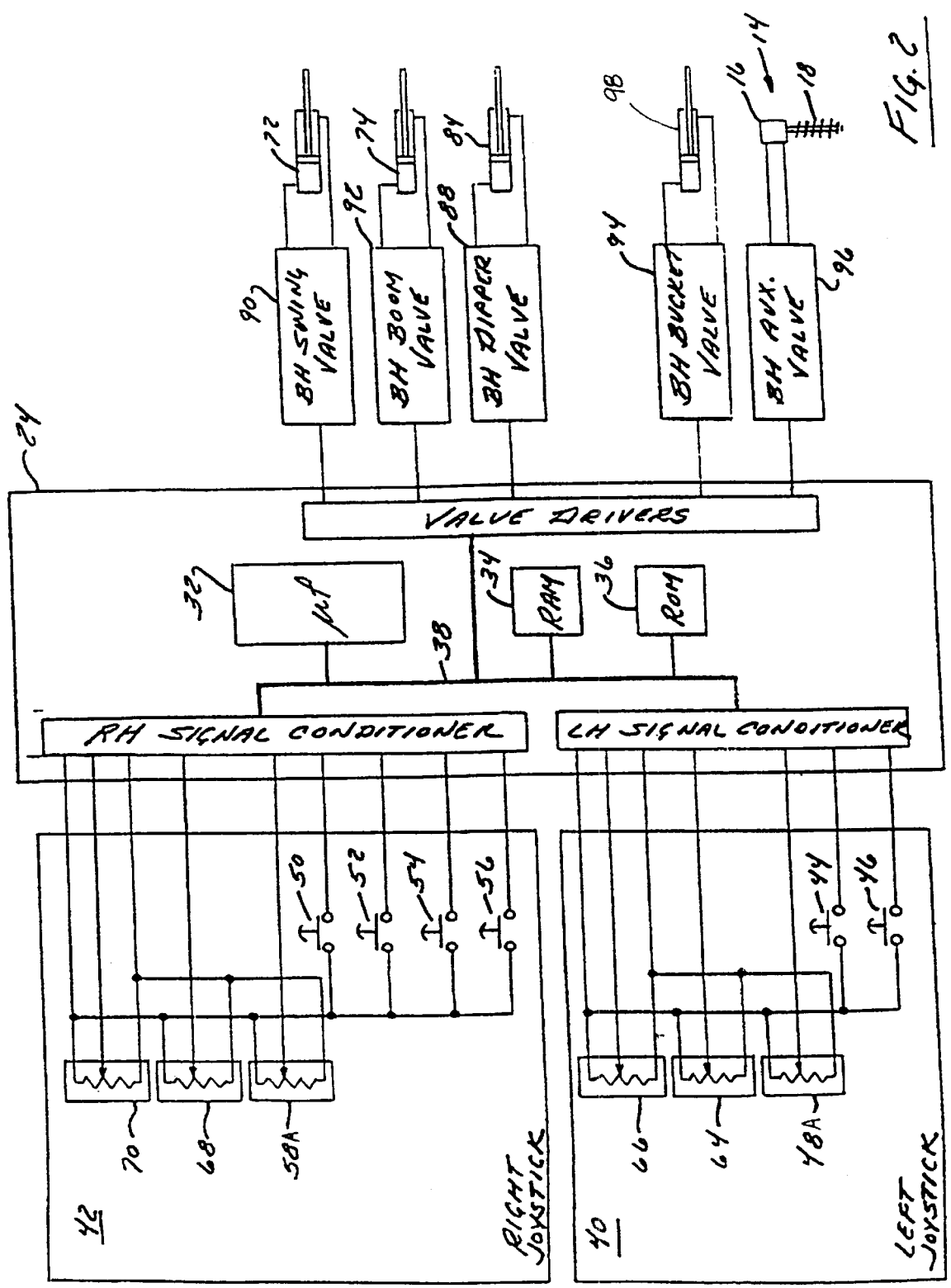
FIG. 2 is a schematic representation of the controller, with its associated operator controls, hydraulic cylinders for controlling boom position, and auxiliary control valve for regulating the flow of hydraulic fluid to the implement.

Referring now to FIG. 2, controller 24 includes a microprocessor 32, RAM 34 and ROM 36 coupled together over bus 38. ROM 36 stores a program that is executed by microprocessor 32 when microprocessor 32 is energized.

The controls shown in left-hand control group 40 are located on the upper end of the left-hand lever 20 (FIGS. 3, 4) that is located in cab of vehicle 10. The controls shown in right-hand control group 42 are located on the upper end of right-hand lever 22 that is located in the cab of vehicle 10. When the operator grasps the upper ends of the two levers 20, 22, he is able to manipulate any and all of these controls with the fingers of his left and right hands, respectively, without removing his hands from the levers.

The controls in the left-hand control group 40 include buttons 44 and 46, and thumbwheel 48. The controls in the right-hand control group 42 include buttons 50, 52, 54, 56; and thumbwheel 58. These controls and their orientation on the end of the lever handgrips 60, and 62 (the left and right hand grips, respectively), can be seen in FIGS. 4 and 6. The two thumbwheels, 48, 58 are spring-loaded such that they can be rolled toward or away from the operator. If they are oriented in a vertical position in the hand controls this would correspond to down or up with respect to the operator. When they are released, they return to a neutral and central position. The switches on each handgrip are spring loaded momentary-contact switches, and return to an un-depressed position when they are released.

Figure 5:
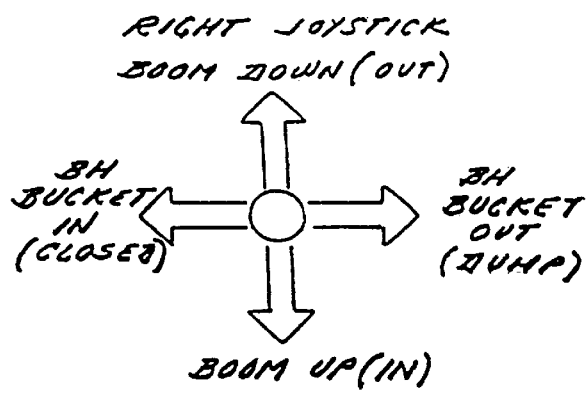
FIG. 5 is a plan view of the right hand lever or joystick showing what functions are performed when the lever is tilted front-to-back and side-to-side.

The base of each lever 20, 22 where it is coupled to the inside of the cab has two potentiometers that are arranged to sense the tilting of the levers about their bases in two orthogonal directions. One potentiometer on each lever senses the lateral tilt of the lever, i.e. side-to-side tilt, from the operator's perspective, and one potentiometer on each lever senses fore-and-aft tilt, i.e. away from and towards the operator, respectively. In this manner, the operator, by moving the joystick in the direction shown in FIGS. 3 and 5, can move the arm and the implement in a variety of directions without removing his hands from either the left or right hand controls. The potentiometer responsive to forward and backward motions of the left joystick (i.e., away from and toward the operator's body) is potentiometer 64. The potentiometer that is responsive to side-to-side motion of the left hand lever is potentiometer 66. The potentiometer that is responsive to fore and aft motion of right lever is potentiometer 68 and the potentiometer that is responsible for side-to-side motion of the right lever is potentiometer 70.

Each of these four potentiometers is configured to generate a signal indicative of the degree of deflection of its associated lever. When the levers are released, they are spring-loaded to return to a neutral position, in which the levers are neither tilted forward or aft, or side-to-side. Thus, when the levers are in their neutral position, they can be moved fore or aft and leftward or rightward, depending upon the operator's inclination. The levers are disposed on either side of the operator as the operator faces directly backwards toward boom 12 in the seat position shown in FIG. 1, away from the front of the vehicle. In this position, the levers are disposed on either side of the operator within easy grasp of his left and right hands.

Referring back to FIG. 1, the posthole digger implement is located on the end of several jointed arms that permit the operator to move the digger from place to place. The joint arm includes a boom 78 that is coupled to the base of the backhoe vehicle 10. There are two boom swing cylinders 72 coupled to the base of the boom to pivot it side to side about a substantially vertical axis located at the rear of the backhoe. The arrangement of these cylinders, and the manner in which they are coupled to the boom are well known in the art. In addition to boom swing cylinders 72, is a boom lifting cylinder 74. This cylinder is located along the lower end of the boom. In a typical arrangement, when this cylinder is retracted, the boom is lifted upward at its outer end, pivoting about a substantially horizontal axis 76 disposed at the rear of the backhoe.

Another arm 80, called a "dipper", is pivotally coupled to the free end of the boom—the end located away from the backhoe. The dipper pivots up and down with respect to the end of the boom about a substantially horizontal axis 82 located at the free end of the boom. A dipper cylinder 84, typically extending along the length of the boom is coupled to the boom and the dipper such that (in a typical arrangement) the dipper is lifted upwards at its free end when the dipper cylinder retracts, and is lowered at its free end when the dipper cylinder extends.

The end of the dipper has a bucket (or implement) linkage 98 to which a digging bucket (or implement) is normally attached. In the present embodiment, a hydraulically driven implement 14—the post hole digger—is attached to bucket linkage 98 in place of the bucket itself.

A bucket cylinder 86 is coupled to bucket linkage 98 and to dipper 80 such that when bucket cylinder 86 extends, the bucket linkage curls up inward toward the dipper. In other words, the bucket (or implement) rotates counter-clockwise with respect to the end of the dipper to which it is coupled. When the bucket cylinder is retracted, the bucket linkage uncurls. In other words, it rotates clockwise with respect to the end of the dipper to which it is coupled.

By combining the operation of all five cylinders—the bucket cylinder 86, the dipper cylinder 84, the boom cylinder 74 and the two boom swing cylinders 72—the implement can contact the ground at virtually any location within the fully extended operating range of the backhoe.

Figure 3:
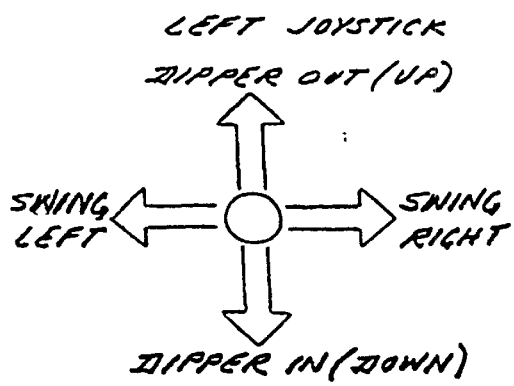
FIG. 3 is a plan view of the left hand lever or joystick showing what functions are performed when the lever is tilted front-to-back and side-to-side.
Figure 4:
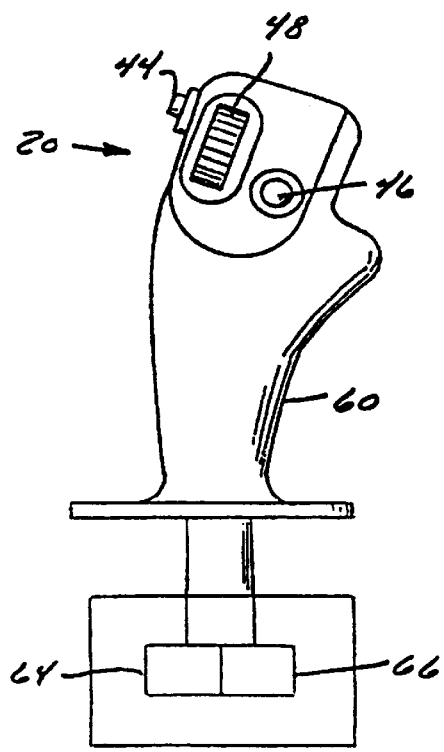
FIG. 4 is a rear elevation view of the left-hand lever.

The operator positions, the post hole digger for example, by manipulating the two levers and the various controls that are mounted on the handgrips of levers 20, 22 shown in FIGS. 3–6. As shown in FIGS. 3 and 4, when the left hand lever is pivoted away from the operator, the dipper moves outward by retracting the dipper cylinder. When the lever pivots inward, the dipper is retracted, by extending the dipper cylinder. The microprocessor monitors potentiometer 64, shown in FIG. 2, senses when the dipper potentiometer 64 is pivoted away from its neutral, central position, and energizes the dipper cylinder proportional control valve 88 proportionate to the degree of deflection of the lever. Valve 88, in turn controls the flow of pressurized hydraulic fluid to and from the dipper cylinder, causing it to extend and retract according to the left-hand lever position. When the left-hand lever is released, it returns to a neutral position, and the dipper and dipper cylinder stop extending or retracting.

In a similar fashion, when the left-hand lever is moved laterally from its central position to the left, the microprocessor monitors the corresponding leftward deflection of the boom swing potentiometer 66 and energizes the boom swing cylinder valve 90 an amount proportionate to the degree of leftward deflection. The valve is energized and directs flow to the boom swing cylinders 72 such that the boom swings to the left at a rate proportionate to the degree of leftward deflection of the left-hand lever.

When the left-hand lever is moved laterally from its central position to the right, the microprocessor monitors the corresponding rightward deflection of boom swing potentiometer 66 and energizes the boom swing cylinder valve 90 an amount proportionate to the degree of rightward deflection. The valve is energized and directs flow to the boom swing cylinders 72 such that the boom swings to the right at a rate proportionate to the degree of rightward deflection of the left-hand lever.

When the right-hand lever is pivoted away from the operator, the boom pivots downward (outward) by extending boom cylinder 74. When the lever is pivoted inward, the boom pivots upward (inward), by retracting boom cylinder 74.

Figure 6:
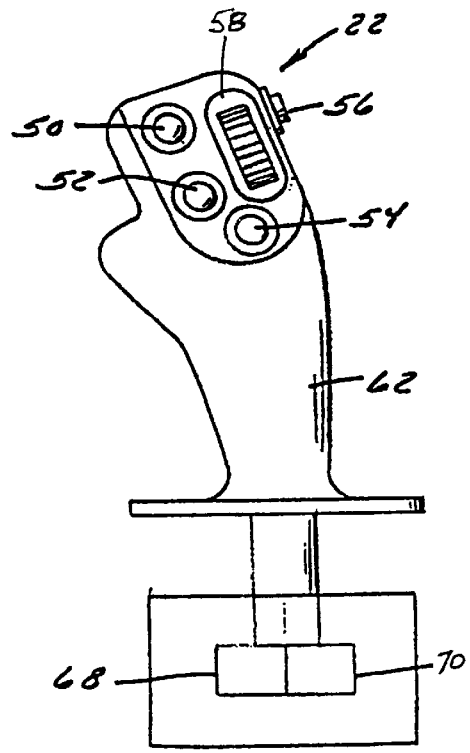
FIG. 6 is a rear elevation view of the right hand lever.

The microprocessor monitors potentiometer 68, shown in FIG. 6, and senses when that potentiometer is pivoted away from its neutral, central position, and energizes the boom cylinder proportional control valve 92 proportionate to the degree of deflection of the lever. Valve 92, in turn, controls the flow of pressurized hydraulic fluid to and from boom cylinder 74, causing it to extend and retract according to the right-hand lever position. When the right-hand lever is released, it returns to a neutral position, and the boom and boom cylinder stop extending or retracting.

In a similar fashion, when the right-hand lever is moved laterally from its central position to the left, the microprocessor monitors the corresponding deflection of the bucket potentiometer 70 and energizes bucket cylinder control valve 94 an amount proportionate to the degree of leftward deflection. The bucket cylinder valve is energized such that the bucket linkage 98 curls inward (counterclockwise in FIG. 1) at a rate proportionate to the degree of leftward deflection of the right-hand lever.

When the right-hand lever is moved laterally from its central position to the right, the microprocessor monitors the corresponding deflection of bucket potentiometer 70 and energizes the bucket cylinder valve 94 an amount proportionate to the degree of rightward deflection. The bucket cylinder valve is energized such that the bucket linkage uncurls (clockwise in FIG. 1) at a rate proportionate to the degree of rightward deflection of the right-hand lever.

Auxiliary Valve Control

The section above described how the operator can move the boom, dipper and bucket linkage by manipulating the two levers 20, 22. At the same time that the operator is manipulating the boom, dipper and bucket linkage, he can also dynamically control the operation of the implement attached to the end of the bucket linkage in the following manner.

Thumbwheel 48 is located on the left-hand handgrip and controls the flow rate to the auxiliary proportional control valve 96. This valve controls the flow of hydraulic fluid to drive motor 16 of implement 14.

The program stored in ROM 36 controls the operation of controller 24 in response to the operator actuating auxiliary valve button 52 and auxiliary valve thumbwheel 48. This operation is shown in the flowchart of FIG. 7.

Figure 7:
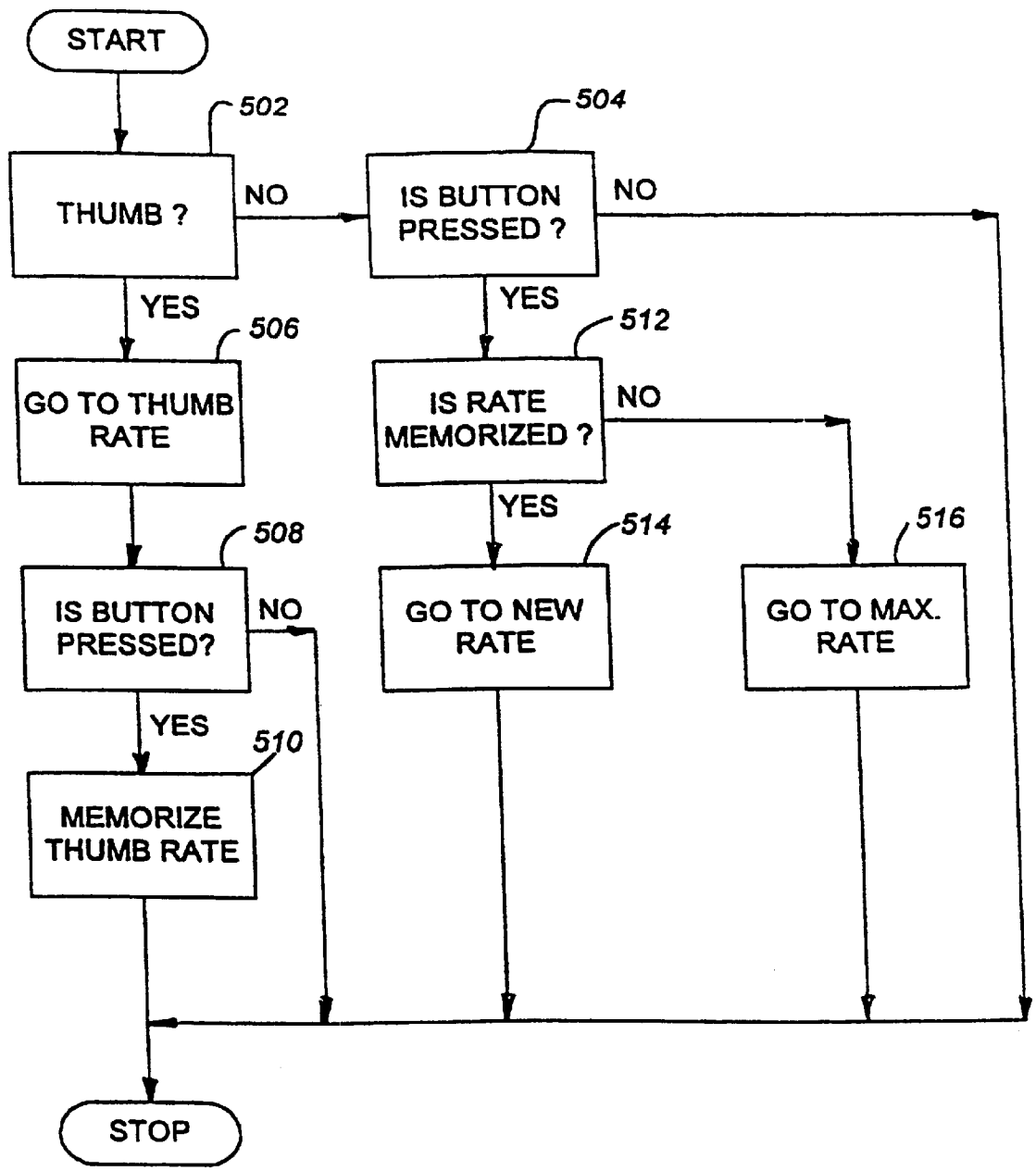
FIG. 7 is a flow chart of a polling routine executed by the digital controller that enables the controller to respond to the operator's manipulation of the thumbwheel and the auxiliary switch.

The process shown in FIG. 7 is a portion of the polling loop performed by controller 24 at frequent intervals during the operation of the vehicle 10. In this polling loop, which typically occurs every 10 milliseconds or so, the microprocessor checks the position of all the switches and thumbwheel potentiometers located on the hand grips, and the positions of the potentiometers that are coupled to the base of the levers. Thus, although the flowchart says "START" and "STOP", it should be understood that this process is repeated again and again, many times each second.

Auxiliary button 52 and auxiliary thumbwheel 48 function overall as follows. Whenever the thumbwheel is deflected and the auxiliary button is not depressed, controller 24 commands auxiliary valve 96 to open proportional to the degree of deflection of the thumbwheel. Whenever the auxiliary button is depressed and the thumbwheel is not deflected, the controller commands auxiliary valve 96 to open to a predetermined position. This position may be a position that corresponds to the full flow rate of the auxiliary valve, or it may correspond to some different flow rate that has been dynamically saved by the operator. The operator can select and save such a flow rate by substantially simultaneously manipulating the auxiliary button and the thumbwheel together as described below.

To set a particular flow rate, the operator simultaneously presses the auxiliary button 52 and deflects the auxiliary thumbwheel 48. If both are manipulated simultaneously, controller 24 records a flow rate equivalent to the flow rate commanded by the auxiliary thumbwheel. Once the auxiliary button is released, this flow rate is preserved in the memory, either RAM or ROM, as desired, of controller 24. It is preferably preserved in RAM, and is therefore deleted when vehicle 10 is turned off.

Once a particular flow rate has been preserved in memory by releasing the auxiliary button, as described above, each time the operator presses the auxiliary button (while not deflecting the auxiliary thumbwheel), the auxiliary valve 96 opens to the previously saved flow rate.

A computer program that will provide this capability is illustrated in FIG. 7. In block 502 of the flow chart of FIG. 7, microprocessor 32 polls auxiliary thumbwheel 48 on the handgrip of lever 20—the left lever—to determine if it has been deflected away from its neutral position. If it has been deflected away from its neutral position, the voltage arriving at controller 24 from the central tap of the thumbwheel potentiometer 48A will be different, either greater or lesser, than the voltage generated at the central tap when the thumbwheel is in its neutral position. If the voltage is greater, it indicates that the thumbwheel has been deflected in one direction. If the voltage is lesser it indicates that the thumbwheel has been deflected in the opposite direction. In either case, a voltage different from the neutral position voltage on one of the potentiometer lines indicates that the thumbwheel has been deflected.

As we described above, controller 24 will take different actions based upon whether the thumbwheel has been actuated by itself or substantially concurrently with an actuation of the auxiliary button 52. In block 502 controller 24 checks to see if the thumbwheel has been moved away from neutral. If so, controller 24 proceeds to block 506 and sets the auxiliary valve flow rate substantially proportional to the degree of deflection of the thumbwheel. Controller 24 then checks to see if the auxiliary button has been pressed in block 508. If so, the processor memorizes the current flow rate—the flow rate indicated by the thumbwheel position. In block 510, this value is saved in RAM or ROM for future use.

If the auxiliary button is not pressed in block 508, processor 32 leaves this portion of the polling loop without taking further action without shutting off the auxiliary valve.

Since this loop is executed quite frequently, whenever the operator changes the position of the thumbwheel, the signal sent to the auxiliary valve will change responsively and at substantially the same time. This will preferably occur with no discernable time lag between changing the thumbwheel position and changing the flow rate.

On the other hand, if the thumbwheel is not deflected by the operator block 502, controller 24 branches to block 504. In block 504, controller 24 checks to see whether the auxiliary button is pressed. If it is pressed, controller 24 checks to see if there is a previously saved auxiliary valve flow rate in block 512. If there is a previously saved flow rate, controller 24 determines the appropriate signal to be applied to the auxiliary valve to supply that flow rate and applies that signal to auxiliary valve 96 in block 514 and exits this portion of the polling loop.

On the other hand, if there is no previously saved flow rate, controller 24 applies a signal to the auxiliary valve calculated to cause the maximum valve flow rate block 516 and exits this portion of the polling loop.

The operator can record a flow rate, return to a previously saved flow rate, and vary the flow rate proportional to a variable input device (the auxiliary thumbwheel) without removing his hands from either lever. Thus, the system enables the operator to move the jointed arm while simultaneously varying and recording the flow rate to an implement attached thereto.

What is claimed is:

1. A work vehicle configured to be coupled to an implement operated by a flow of hydraulic fluid, the vehicle comprising:
   a. a chassis;
   b. an engine coupled to the chassis;
   c. a hydraulic pump coupled to the engine to generate a flow of pressurized hydraulic fluid;
   d. an auxiliary proportional control valve fluidly coupled to the pump to receive, regulate and transmit the flow of pressurized hydraulic fluid and configured to be fluidly coupled to the implement and responsive to a valve-opening signal;
   e. an implement support arm pivotally coupled to the chassis and configured to be moved in at least two directions;
   f. a first hand control manipulable to move the arm in a first direction, the hand control including a first operator actuable switch;

g. a second hand control configured to move the arm in a second direction different from the first direction, the second hand control including a second operator actuable control having a plurality of positions; and h. a digital controller coupled to both the first operator actuable switch and the second operator actuable control, wherein the controller is configured in a first mode of operation to generate the valve opening signal indicative of the position of the second operator-actuable control when the second control is in each of said plurality of positions, and further wherein the controller is configured in a second mode of operation to record a digital value indicative of the valve opening signal when the second operator actuable control is in each of the plurality of positions and when the operator actuates the first switch.

2. The work vehicle of claim 1, wherein the first hand control is disposed to be operated by one hand of the operator and the second hand control is disposed to be operated by another hand of the operator.

3. The work vehicle of claim 2, wherein the first and second hand controls are disposed to permit simultaneous operation by the operator.

4. The work vehicle of claim 3, wherein the support arm is a backhoe assembly including a boom, a dipper and a bucket linkage.

5. The work vehicle of claim 4, wherein a first of the two directions is the rotation of the boom about a pivotal axis.

6. A method of setting and retrieving a predetermined auxiliary hydraulic fluid flow rate for an implement actuated by a variable flow of hydraulic fluid that is attached to a hydraulically moveable arm extending from a work vehicle having an operator's station and at least two hand controls, wherein one hand control is configured to drive a first actuator to move the member in a first direction and the second hand control is configured to drive a second actuator to move the member in a second direction different than the first direction, wherein the first hand control includes a first finger control configured to generate a signal when actuated by a finger, and the second hand control includes a second finger control that generates a varying signal based upon the degree of deflection of the second finger control, the method comprising:

a. manipulating the first hand control to position the member in a first position;

b. manipulating the second hand control to position the member in a second position different from the first position;

c. engaging the first finger control;

d. engaging the second finger control to generate a signal indicative of a desired auxiliary hydraulic fluid flow rate, substantially simultaneously with the first finger control; and e. automatically recording a digital value indicative of the desired auxiliary fluid flow rate based upon the simultaneous engagement of the first and second finger controls and a degree of deflection of the second finger control.

7. The method of claim 6, further comprising the steps of:

f. releasing the first and second finger controls;

g. re-engaging the first finger control after the step of releasing; and h. automatically generating the desired auxiliary hydraulic fluid flow rate in response to the step of re-engaging.

8. The method of claim 6, further comprising the steps of:

f. releasing the first and second finger controls;

g. re-engaging the first finger control;

h. re-engaging the second finger control to generate a second signal indicative of a second desired auxiliary hydraulic fluid flow rate, substantially simultaneously with the first finger control; and i. automatically recording a second value indicative of the second desired auxiliary fluid flow rate based upon the simultaneous engagement of the first and second finger controls.

9. The method of claim 6, further comprising the steps of:

f. turning the work vehicle off;

g. turning the work vehicle on; and h. going to a predetermined auxiliary flow rate different from the desired auxiliary fluid flow rate.

10. A method of setting a predetermined auxiliary hydraulic fluid flow rate for an auxiliary hydraulic valve of a backhoe having a boom, a dipper, a bucket linkage, two hand controls, and a seat for an operator, wherein one hand control is disposed to be grasped and operated by a left hand of the operator, and another hand control is disposed to be grasped and operated by a right hand of the operator, and further wherein the two hand controls are configured to perform the functions of swinging the backhoe boom, raising and lowering the backhoe boom, raising and lowering the dipper, and opening and closing the bucket linkage, and further wherein one of the hand controls has a momentary contact button, and another of the hand controls has a proportional input device disposed for use by the operator's finger, the method including the steps of:

a. engaging the button;

b. engaging the proportional input device to generate a signal indicative of a desired auxiliary hydraulic fluid flow rate, substantially simultaneously with the button;

c. automatically recording a value indicative of the desired auxiliary fluid flow rate based upon the simultaneous engagement of the button and proportional input device and a degree of deflection of the proportional input device;

d. releasing the button and the proportional input device;

e. re-engaging the button after the step of releasing; and f. automatically generating the desired auxiliary hydraulic flow rate after the step of re-engaging the button.

* * * * *